United States Patent
Yano (10) Patent No.: US 11,425,269 B2
(45) Date of Patent: Aug. 23, 2022

(54) INFORMATION PROCESSING APPARATUS FOR REGISTERING SELECTED INFORMATION PROCESSING APPARATUSES DETECTED AS BEING CONNECTED TO A SAME NETWORK, AND INFORMATION PROCESSING METHOD

(71) Applicant: Canon Kabushiki Kaisha, Tokyo (JP)

(72) Inventor: Yukari Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 17/188,343

(22) Filed: Mar. 1, 2021

(65) Prior Publication Data

US 2021/0274053 A1  Sep. 2, 2021

(30) Foreign Application Priority Data

Mar. 2, 2020 (JP) .............................. JP2020-035219

(51) Int. Cl.
*H04N 1/00* (2006.01)
*H04N 1/32* (2006.01)
*H04L 67/51* (2022.01)

(52) U.S. Cl.
CPC ......... *H04N 1/00244* (2013.01); *H04L 67/16* (2013.01); *H04N 1/00037* (2013.01); *H04N 1/00344* (2013.01); *H04N 1/32502* (2013.01); *H04N 2201/0094* (2013.01)

(58) Field of Classification Search
CPC .......... H04N 1/00244; H04N 1/00344; H04N 2201/0094; G06F 3/1286; G06F 3/1224; G06F 3/1229; G06F 3/1231; G06F 3/1293; H04L 67/16

USPC ....................................................... 358/1.15
See application file for complete search history.

(56) References Cited

U.S. PATENT DOCUMENTS

| | | | | |
|---|---|---|---|---|
| 2013/0321861 | A1* | 12/2013 | Ishihara ................ | G06F 3/1293 358/1.15 |
| 2014/0226179 | A1* | 8/2014 | Minagawa ............ | G06F 3/1204 358/1.15 |
| 2015/0317108 | A1* | 11/2015 | Hadano ................ | G06F 3/1231 358/1.15 |

FOREIGN PATENT DOCUMENTS

| | | |
|---|---|---|
| JP | 2016118863 A | 6/2016 |
| JP | 2019-219970 A | 12/2019 |

OTHER PUBLICATIONS

Japanese Office Action dated Jun. 4, 2021 in corresponding Japanese Patent Appln. No. 2020-035219.

* cited by examiner

*Primary Examiner* — Kent Yip
(74) *Attorney, Agent, or Firm* — Venable LLP (57) ABSTRACT

An information processing apparatus for registering devices with a service is provided. The apparatus includes a detection unit configured to detect devices connected to a same network as the information processing apparatus, a specification unit configured to specify devices not registered with the service, among the detected devices, and a registration unit configured to perform registration processing for registering at least one device, among the specified devices, with the service.

11 Claims, 10 Drawing Sheets

DEVICE REGISTRATION APPLICATION

INPUT OF DEVICE REGISTRATION CODE

PLEASE INPUT A DEVICE REGISTRATION CODE

0123 - 4567 - 8901 - 2345

PRESS "NEXT" TO SEARCH FOR UNREGISTERED DEVICES

NEXT ▶

LOG OUT

FIG. 7

DEVICE REGISTRATION APPLICATION

LIST OF UNREGISTERED DEVICES

| No. | DEVICE NAME | SERIAL NO. | IP ADDRESS |
|---|---|---|---|
| 1 | iR-ADV 8505 | ABC123456 | 172.16.9.8 |
| 2 | iR-ADV 3520 | ABC123457 | 172.16.9.9 |
| 3 | iR-ADV C5535 | ABC123458 | 172.16.9.10 |
| 4 | iR-ADV C250 | ABC123459 | 172.16.9.11 |
| 5 | MF735C | ABC123460 | 172.16.9.12 |
| 6 | | | |

REGISTRATION START ▶

LOG OUT

```
POST https://server.example.com/api/deviceregistration?         1002
code=0123-4567-8901-2345 HTTP/1.1
......

{
    "SerialNumber":  "ABC123456789",
    "FQDN":  "device.example.com",                               1003
    "IP":  "172.16.100.101",
    ......
}
```

F I G. 11  1101

```
HTTP/1.1 200 OK
......

{
    "DeviceId":  "example_deviceid",
    "ClientId":  "example_clientid",
    "Secret":  "example_secret",
    "Scope":  "http://localhost/webapi",
    "TenantUrl":  "https://tenant.cloud.example.com",
    "TokenUri":  "https://token.example.com/api/token"
    ......
}
```

F I G. 12  1201

```
POST https://token.example.com/api/token HTTP/1.1
......

client_id=example_clientid&client_secret=example_secret&s
cope=http%3A%2F%2Flocalhost%2Fwebapi&grant_type=client_cr
edentials
```

FIG. 13                        1301

```
HTTP/1.1 200 OK
......

{
        "token_type": "example:token:type",
        "access_token": "qwertyuioplkjhgfdsazxcvbnm",
        "scope": "http://localhost/webapi",
        "expires_in": "3600"
        ......
}
```

INFORMATION PROCESSING APPARATUS FOR REGISTERING SELECTED INFORMATION PROCESSING APPARATUSES DETECTED AS BEING CONNECTED TO A SAME NETWORK, AND INFORMATION PROCESSING METHOD

BACKGROUND OF THE INVENTION

Field of the Invention

The present invention relates to an information processing apparatus and an information processing method.

Description of the Related Art

In recent years, the popularization of cloud services has led to an increasing number of systems in which cloud services and devices operate cooperatively. With cloud services, a form of use that involves devices being managed by a tenant is also becoming prevalent. A tenant is a unit of service provision in an environment in which one cloud (system) environment is jointly used by the systems and applications of a plurality of companies. A tenant is provided for every company or every contract, for example. In order for devices to be managed by a tenant, the devices may be registered with the tenant. By registering a plurality of devices with one tenant, centralized management by use unit such as by organization or client becomes possible, and various functions such as user management, application management on devices, use condition reports and accounting management can be centrally provided. For example, in user management, by performing user registration once on a cloud service, it is no longer necessary to perform user registration on a device-by-device basis. As methods for registering a device with a tenant, there is a method that involves using a UI (User Interface) on the device, a method that involves using an application on an information processing apparatus (e.g., PC (Personal Computer)), and other such methods. Japanese Patent Laid-Open No. 2016-118863 proposes a technology for managing tenant information such as by appropriately associating a plurality of tenants respectively with a plurality of devices, and appropriately mapping the devices.

Registering a plurality of devices individually with a cloud service takes time and effort on the part of the user. This can be particularly burdensome in the case of wanting to start using a large number of devices at the same time. This issue also similarly applies in the case of registering devices to services other than cloud services.

SUMMARY OF THE INVENTION

An aspect of the present invention is to reduce the burden on users for registering devices to services.

According to an embodiment, there provided is an information processing apparatus for registering devices with a service, the apparatus comprising: a detection unit configured to detect devices connected to a same network as the information processing apparatus; a specification unit configured to specify devices not registered with the service, among the detected devices; and a registration unit configured to perform registration processing for registering at least one device, among the specified devices, with the service.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Configuration

Figure 1:
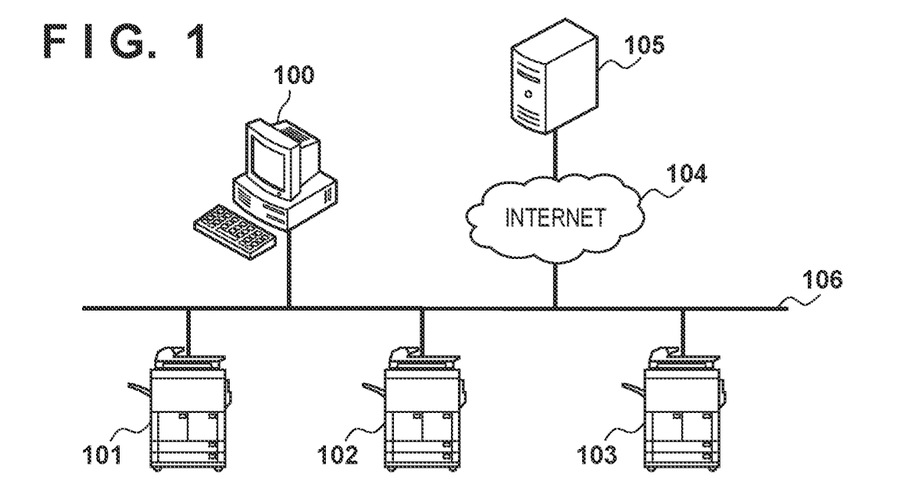
FIG. 1 is a diagram showing an example configuration of an information processing system of an embodiment of the present invention.

An example of the overall configuration of an information processing system according to a first embodiment of the present invention will be illustrated, with reference to FIG. 1. The information processing system includes a PC 100 and MFPs (Multifunction Peripherals) 101 to 103. The PC 100 and MFPs 101 to 103 are connected to each other by a LAN (Local Area Network) 106. The LAN 106 is also connected to an Internet 104. The Internet 104 is an example of a wide area network. A cloud server 105 that provides a cloud service is also connected to the Internet 104. The apparatuses (i.e., PC 100 and MFPs 101-103) connected to the LAN 106 are communicable with the cloud server 105 through the Internet 104. Hereinafter, the cloud service provided by the cloud server 105 will be simply referred to as the cloud service.

The PC 100 is an example of an information processing apparatus (computer). The PC 100 may be a device that is registerable with the cloud service. A prescribed OS (Operating System; not shown) is installed on the PC 100, and various types of applications (not show that execute specific functional processing are also installed on the PC 100.

The MFP 101 is an example of a device that is registerable with the cloud service. The MFP 101 is also referred to as an image processing apparatus. The MFP 101 has a print function, a scanner function, a file transmission function, a fax function, a copy function, and other such functions. The MFP 102 and the MFP 103 are also provided with similar functions to the MFP 101. Thus, the subsequent description relating to MFPs will representatively address the MFP 101. In the example of FIG. 1, the information processing system includes three MFPs 101 to 103, but the number of MFPs is not limited thereto. In the information processing system of the present embodiment, one PC 100 and the one or more other devices (including MFPs or other devices) are connected to each other by the LAN 106. As will be described hereinafter, the MFP 101 is also operable as an information processing apparatus. Thus, in this specification, information processing apparatuses and devices are interchangeable.

The LAN 106 is an example of a local network. The LAN 106 may be a cable LAN (e.g., network based on Ethernet (registered trademark)), or may be a wireless LAN (e.g., network based on WiFi (registered trademark)). A single network is formed by nodes (PC 100, MFPs 101-103, and unshown router) connected to the LAN 106. The single network may be a network that is constituted by nodes having the same network address. In other words, the single network is formed by nodes within broadcast range. In the example in FIG. 1, the PC 100 and the MFPs 101 to 103 are connected to the same network.

The cloud server 105 provides services in coordination with clients such as the PC 100 and the MFP 101 that are communicable via the Internet 104. Furthermore, the cloud server 105 has a function of registering the MFP 101 and the like with the cloud service in response to a request from an application that operates on the MFP 101 and the like.

Hardware Configuration (PC)

Figure 2:
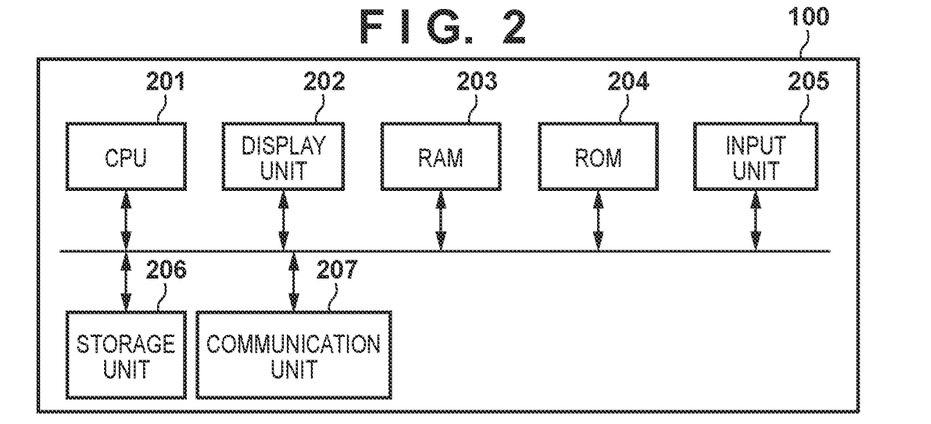
FIG. 2 is a diagram showing the hardware configuration of a PC of an embodiment of the present invention.

An example of the hardware configuration of the PC 100 will be illustrated, with reference to FIG. 2. The PC 100 may include the constituent elements shown in FIG. 2. These constituent elements may be connected to each other by a system bus.

A CPU (Central Processing Unit) 201 is constituted by a processor or the like, for example, and controls the operations of the entire PC 100. A RAM (Random Access Memory) 203 is constituted by a volatile memory or the like, and functions as a work memory for the CPU 201 to execute programs stored in a storage unit 206, for example. A ROM (Read Only Memory) 204 is constituted by a nonvolatile memory or the like, and stores a boot program, for example.

An input unit 205 is constituted by a keyboard or a pointing device, for example, and acquires input from a user. A display unit 202 is constituted by a liquid crystal display, for example, and presents visual information to the user. The storage unit 206 is constituted by an HDD (Hard Disk Drive), an SSD (Solid State Drive) or the like, and stores programs (e.g., OS, applications) and data that are used by the PC 100. The storage unit 206 may be referred to as a secondary memory device or an auxiliary storage device. A communication unit 207 is constituted by a network card, a wireless LAN module or the like, for example, and communicates with other devices (e.g., MFPs 101-103, cloud server 105). The communication unit 207 performs communication using a communication protocol such as HTTP or TCP/IP, for example.

Processing by the PC 100 may be performed by the CPU 201 reading out programs stored in the storage unit 206 to the RAM 203 and executing the programs. Alternatively, some or all of the processing of the PC 100 may be performed by a dedicated circuit such as an ASIC (Application Specific Integrated Circuit) or an FPGA (Field Programmable Gate Array).

Hardware Configuration (MFP)

Figure 3:
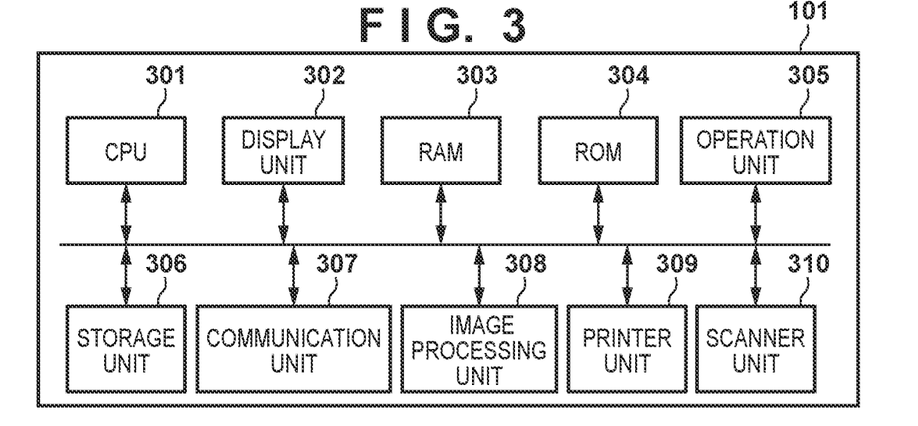
FIG. 3 is a diagram showing the hardware configuration of an MFP of an embodiment of the present invention.

An example of the hardware configuration of the MFP 101 will be illustrated, with reference to FIG. 3. The MFP 101 may include the constituent elements shown in FIG. 3, These constituent elements may be connected to each other by a system bus.

A CPU 301 is constituted by a processor or the like, for example, and controls the operations of the entire MFP 101. A RAM 303 is constituted by a volatile memory or the like, and functions as a work memory for the CPU 301 to execute programs stored in a storage unit 306, for example. The RAM 303 also functions as an image memory for temporarily storing image data. A ROM 304 is constituted by a nonvolatile memory or the like, and stores a boot program, for example.

An operation unit 305 is constituted by a touch panel or hard keys, for example, and acquires operations by the user. A display unit 302 is constituted by a liquid crystal display, for example, and presents visual information to the user. The display unit 302 and the operation unit 305 may be integrally constituted as a touch screen. The storage unit 306 is constituted by an HDD or the like, and stores programs (e.g., OS, applications) and data that are used by the MFP 101, The storage unit 306 may be referred to as a secondary memory device or an auxiliary storage device. A communication unit 307 is constituted by a network interface such as a network interface card or a wireless LAN module, for example, and communicates with other devices (e.g., PC 100, other MFPs, cloud server 105). The communication unit 307 performs communication using a communication protocol such as HTTP or TCP/IP, for example.

An image processing unit 308 performs image processing such as rotation, color conversion and image compression/decompression processing on image data read by a scanner unit 310 and image data to be output to a printer unit 309. The printer unit 309 receives image data processed by the image processing unit 308, and performs printing in accordance with attribute data that is attached to this image data. The scanner unit 310 reads an image on an original, and creates image data of this image.

Processing by the MFP 101 may be performed by the CPU 301 reading out programs stored in the storage unit 306 to the RAM 303, and executing the programs. Alternatively, some or all of the processing of the MFP 101 may be performed by a dedicated circuit such as an ASIC or an FPGA.

Software Configuration (Device Registration Application 400)

Figure 4:
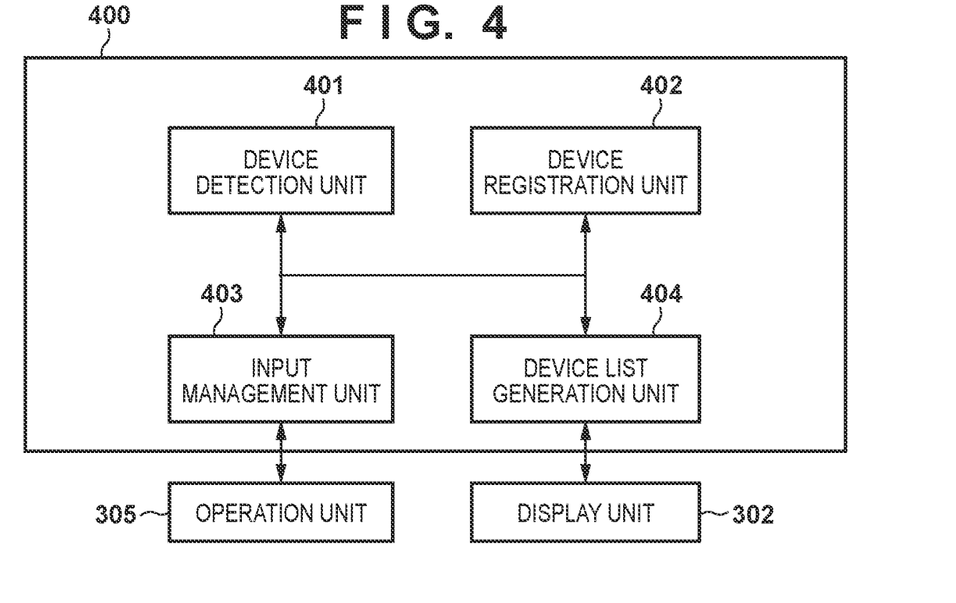
FIG. 4 is a diagram showing the software configuration of a device registration application of an embodiment of the present invention.

An example of the software configuration of the MFPs 101 to 103 will be illustrated, with reference to FIG. 4. In the example in FIG. 4, a device registration application 400 is installed in each of the MFPs 101 to 103. In the following description, the device registration application 400 will be simply represented as the application 400. In the following description, an example is given in which the application 400 is only installed in the MFPs 101 to 103 among the constituent elements of FIG. 1, but the application 400 may also be installed in the PC 100. The application 400 provides a function for registering the MFPs 101 to 103 with the cloud service. The application 400 may be automatically started at the time of starting up the MFPs 101 to 103.

According to the present embodiment, by operating one device (e.g., MFP 101), the user is able to register not only this device but also other devices (e.g., MFPs 102 and 103) with a tenant. Registering a device with a tenant enables the device to use the services and functions that are provided by the cloud service.

Figure 6:
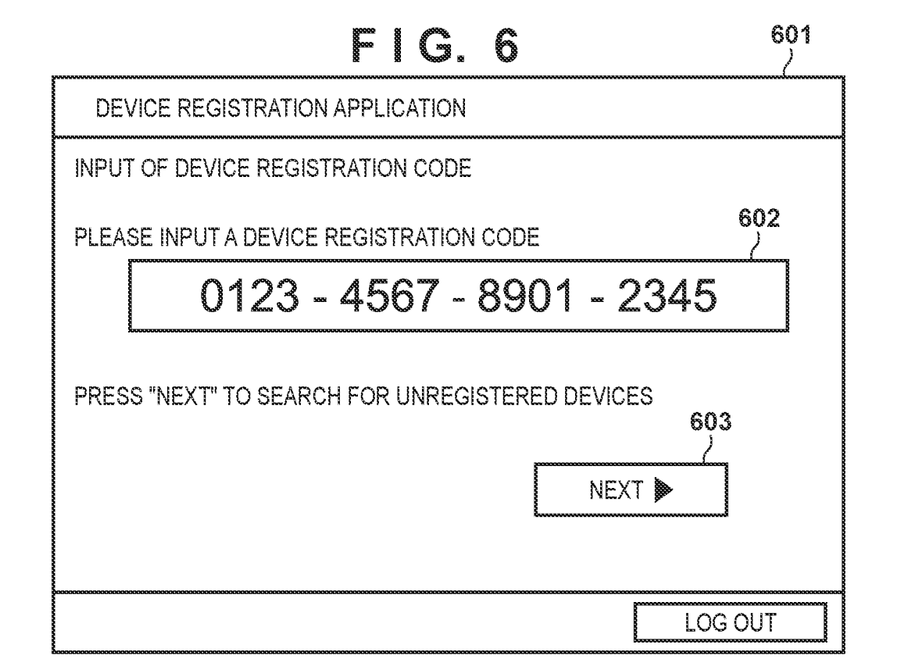
FIG. 6 is a diagram showing an example of a screen of an embodiment of the present invention.
Figure 16:
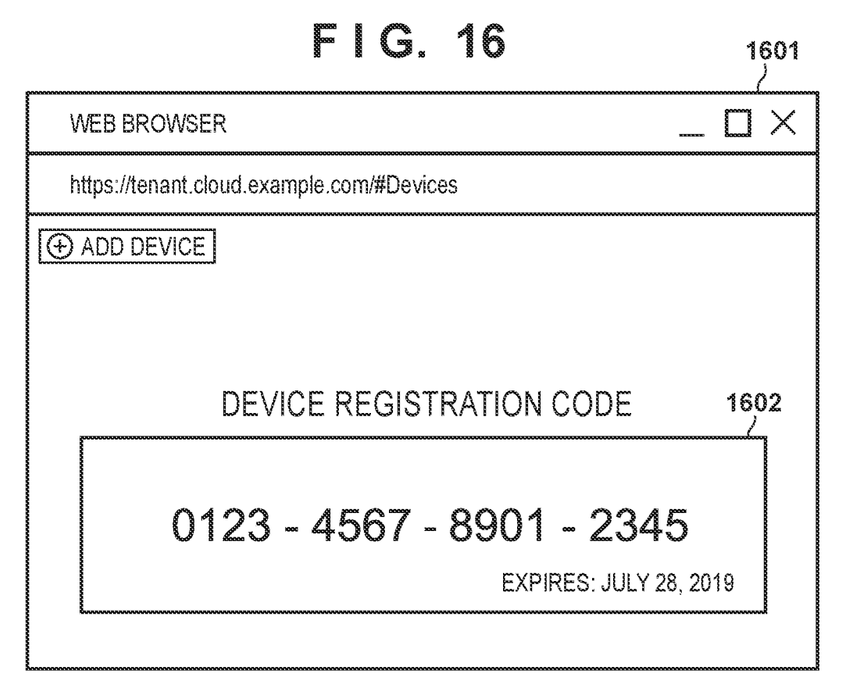
FIG. 16 is a diagram showing a device registration code acquisition screen of an embodiment of the present invention.

Specifically, in order to collectively register a plurality of devices connected to the same network with the cloud service, the user inputs information that is used in order to register devices with a tenant to one device. In the following description, a device registration code will be treated as an example of information used in order to register devices with a tenant. A device registration code is key information that is provided by the cloud service to devices that are attempting to register with the cloud service, and includes identification information of the tenant or other such information. The tenant that is identified by the device registration code, that is, the tenant that is targeted for registration by the devices, will hereinafter be called a target tenant. The device registration code is assumed to have sufficient digits for security considerations and a validity period. Alternatively, the device registration code need not have a validity period. Also, it is also possible to use a tenant ID instead of the device registration code. The device registration code is acquired from the cloud server 105 by the user of the MFP 101, before executing the processing for registering the MFPs 101 to 103. For example, the cloud server 105, having received a request for issuance of the device registration code from the user, presents a screen 1601 in FIG. 16 to the user. The screen 1601 includes a device registration code 1602.

The device (e.g., MFP 101) that acquires the device registration code from the user transmits the device registration code to the other devices (e.g., MFPs 102 and 103) within the LAN 106. The other devices (e.g., MFPs 102 and 103) are able to use this device registration code to register themselves with the target tenant. In order to realize such a function, the application 400 of the present embodiment has a device detection unit 401, a device registration unit 402, an input management unit 403, and a device list generation unit 404. The device that transmits the device registration code acquired from the user to the other devices is called a master device. A device that that receives the device registration code from another device and registers itself with the target tenant is called a slave device. The application 400 is also capable of causing a device in which the application 400 is installed to operate as a master device or to operate as a slave device. Accordingly, regardless of which device having the application 400 installed thereon is used, the user is able to register that device and other devices with the target tenant.

The device detection unit 401 has a function of detecting devices connected to the same network. Specifically, the device detection unit 401 has a function of requesting a response from devices on the same network, and a function of responding to requests from devices on the same network. In the master device, the device detection unit 401 broadcasts a device detection request (request 902 in FIG. 9 discussed later) on the LAN 106 via the communication unit 307. In the slave devices, the device detection unit 401, upon receiving the device detection request, sends a response (response 903 in FIG. 9 discussed later) including information on the MFP 101. The application 400 starts standby of the device detection unit 401 together with startup, in readiness for receiving the device detection request.

The device registration unit 402 has a function of performing registration processing for registering devices with the target tenant of the cloud service. In the master device, the device registration unit 402, in the case where pressing of a registration start button 703 (FIG. 7 discussed later) by the user is received, transmits the device registration code that is held in the input management unit 403 to devices. In the slave devices, the device registration unit 402 registers the device thereof with the target tenant, using the received device registration code.

The input management unit 403 receives the device registration code input from the operation unit 305, and holds the received device registration code in the RAM 303. Next, the input management unit 403 queries the cloud server 105 as to whether the device registration code is within the validity period. In the case where information indicating that the validity period has expired is included in the response to this query or where a normal response is not obtained due to an error of some kind, the input management unit 403 does not save the device registration code input by the user in the input management unit 403. If the device registration code is within the validity period, the input management unit 403 saves this device registration code. The input management unit 403 operates in the master device, and need not operate in the slave devices.

The device list generation unit 404 has a function of displaying a device list. The device list generation unit 404 generates a list of devices connected within the LAN 106, by analyzing the responses from other devices within the LAN 106, and displays the generated device list on the display unit 302. In the first embodiment, the device list generation unit 404 is assumed to include only devices that are not registered with any tenant, among the devices connected within the LAN 106, in the list. Devices not registered with any tenant are called unregistered devices. The device list generation unit 404 operates in the master device, and need not operate in the slave devices.

GUI of Device Registration Application

Figure 5:
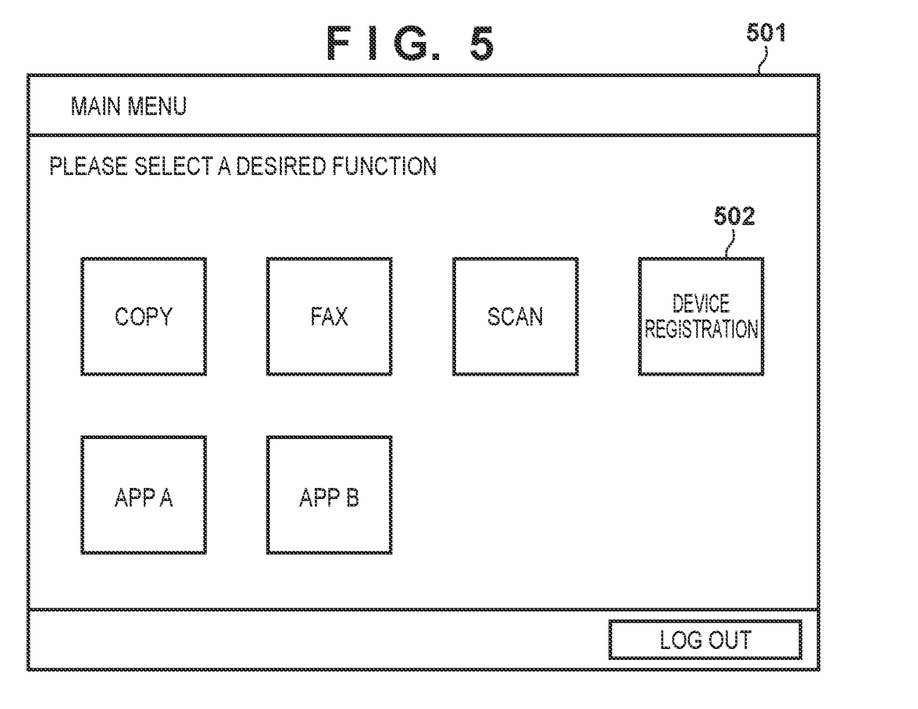
FIG. 5 is a diagram showing an example of a screen of an embodiment of the present invention.

An example of GUI screens of the application 400 will be illustrated, with reference to FIGS. 5 to 8. FIG. 5 shows an example of a main menu screen that is displayed on the display unit 302 of the MFP 101. The application 400 starts operation in the background together with startup of the MFP 101, and waits for pressing of an icon 502 of a main menu 501. The application 400 (specifically, input management unit 403) displays a code input screen 601 shown in FIG. 6 on the display unit 302 when the icon 502 is pressed by the user.

The code input screen 601 is a screen for acquiring the device registration code from the user. The code input screen 601 includes an input field 602 and a button 603 as GUI components. The user is capable of inputting the device registration code to the input field 602 through the operation unit 305. The input management unit 403 holds the device registration code input by the user in the RAM 303 together with displaying the device registration code in the input field 602. The user may acquire the device registration code from the cloud server 105 beforehand using the PC 100, for example. Alternatively, a function of the MFP 101 acquiring the device registration code may be provided.

In the case where a device registration code is held in the input management unit 403, the input management unit 403 may display the saved device registration code in the input field 602, at the same time as transitioning to the code input screen 601. The user may be capable of changing the device registration code displayed in the input field 602 in this way. In the case where the device registration code input by the user is not correct, the input management unit 403 may present a message such as "The input value is not correct", for example, to the user. For example, in the case of a registration code that the cloud server 105 cannot correctly recognize, it is determined that the device registration code is not correct.

Figure 7:
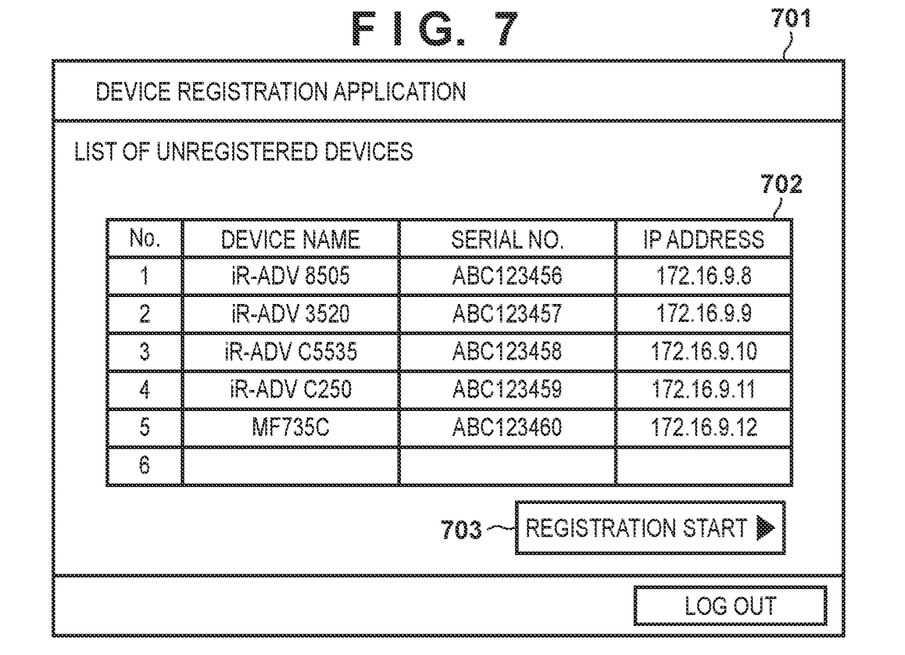
FIG. 7 is a diagram showing an example of a screen of an embodiment of the present invention.

When the button 603 labeled "Next" is pressed in a state where a device registration code is displayed in the input field 602, the application 400 (specifically, device list generation unit 404) displays a device list screen 701 shown in FIG. 7 on the display unit 302. The device list screen 701 includes a. device list 702 and the registration start button 703. The device list 702 is a list of devices determined to be unregistered devices by the device list generation unit 404, among the devices detected by the device detection unit 401. If the device currently being operated by the user is an unregistered device, this device may also be included in the list. The device list 702 may also include information (identification information) for the user to identify the devices, such as serial numbers. Device names and IP addresses may also function as identification information. When the registration start button 703 labeled "Start Registration" is pressed by the user, the device registration unit 402 performs registration processing for registering the devices listed in the device list 702 with the target tenant.

Figure 8:
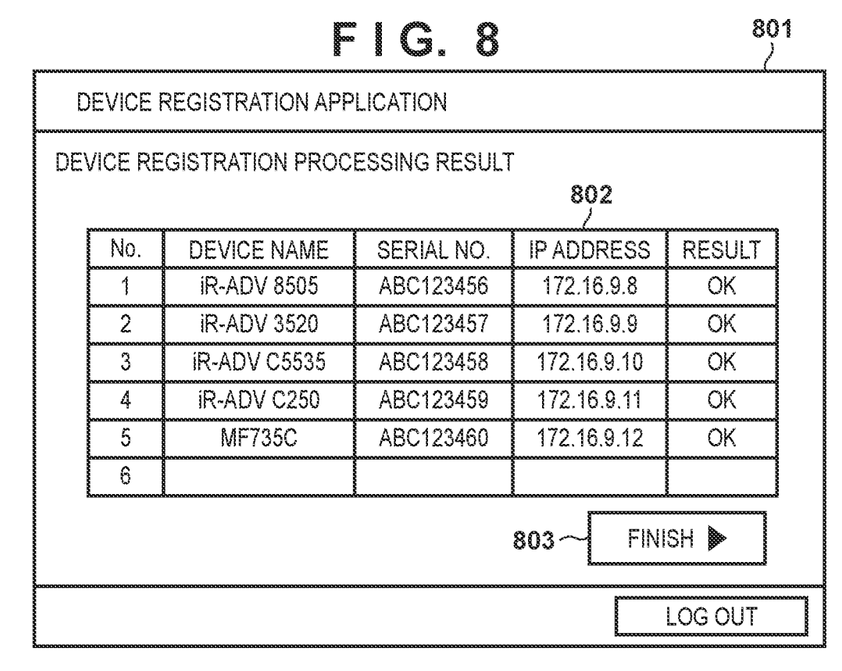
FIG. 8 is a diagram showing an example of a screen of an embodiment of the present invention.

After executing the registration processing, the application 400 (specifically, device list generation unit 404) displays a registration result screen 801 shown in FIG. 8 on the display unit 302. The registration result screen 801 includes a registration result list 802 and a button 803. The registration result list 802 shows a registration result (i.e., whether registration with the target tenant was successful or failed) of devices listed in the device list 702. In the example in FIG. 8, registration of all devices was successful (in FIG. 8, displayed as "OK"). In the case where registration of a device fails. "NG", "Failed" or the like is displayed as the result. A malfunction of the device itself, a problem on the cloud service side, a communication fault or other such problems are conceivable as the cause for device registration failing. A device whose registration fails may try to re-register by re-executing the application 400. When the button 803 labeled "Finish" is pressed by the user, the device registration unit 402 ends the processing, and the FPT 101 returns to displaying the main menu 501 of FIG. 5.

Data Structure of Device Information

Figure 9:
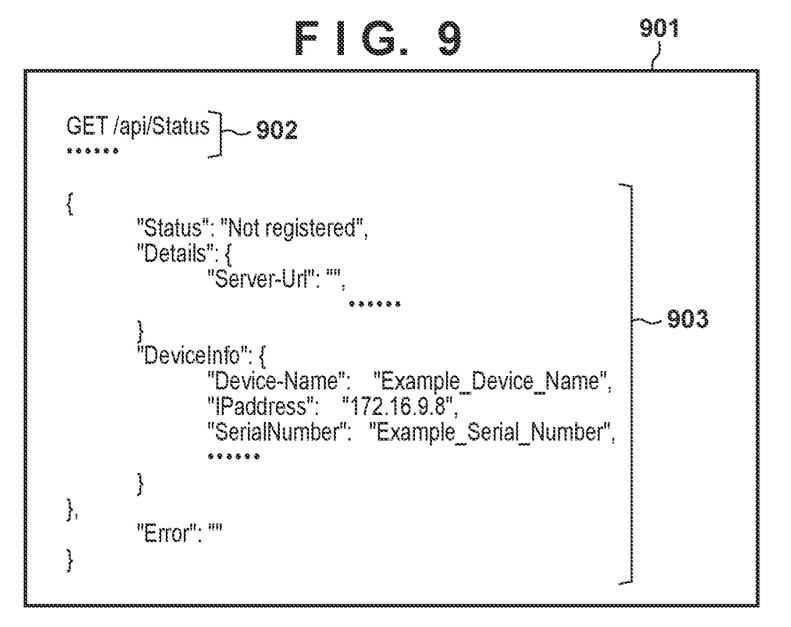
FIG. 9 is a diagram showing the data structure of device information of an embodiment of the present invention.

Next, an example of a data structure of messages that are exchanged between devices will be described, with reference to FIGS. 9 to 13. FIG. 9 shows an example of the data structure of information 901 that is transmitted and received on the network at the time of the device detection unit 401 detecting an unregistered device. The information 901 includes a request 902 and a response 903. The request 902 is a message that is transmitted from the master device the abovementioned example, the MFP 101) to the slave devices (in the abovementioned example, MFPs 102, 103). The response 903 is a response that is transmitted to the master device from the slave devices.

The request 902 is an HTTP (HyperText Transfer Protocol) request, for example. The master device performs processing for accessing a web service with an HTTP GET request and calling a "Status" API (Application Programming Interface).

The response 903 is an HTTP response, for example. Description of information contained in the body of the response 903 is shown in Table 1. The setting values shown in FIG. 9 are an example of the case where a device is unregistered, and shows the device as being unregistered in the case where Status is "Not registered".

TABLE 1

| Major Item | Description | Included Item | Description |
|---|---|---|---|
| Status | Whether registered or not | — | — |
| Details | Details of device registration status | Server-Url | URL of cloud service |
| DeviceInfo | Device information | Device-Name IPaddress SerialNumber | Device name IP address Serial number |

In the present embodiment, an example using HTTP as the request 902 is shown, but the communication protocol is not particularly limited, and may be other communication protocols. Also, an example is shown in which the response 903 is defined in JSON (JavaScript Object Notation) format, but the response is not particularly limited to this format, and may be in other formats. Henceforth, an example will be illustrated in which communication between the MFP 101 and the cloud server 105 in the present embodiment uses HTTP and JSON.

Data Structure of Device Registration Request

Figure 10:
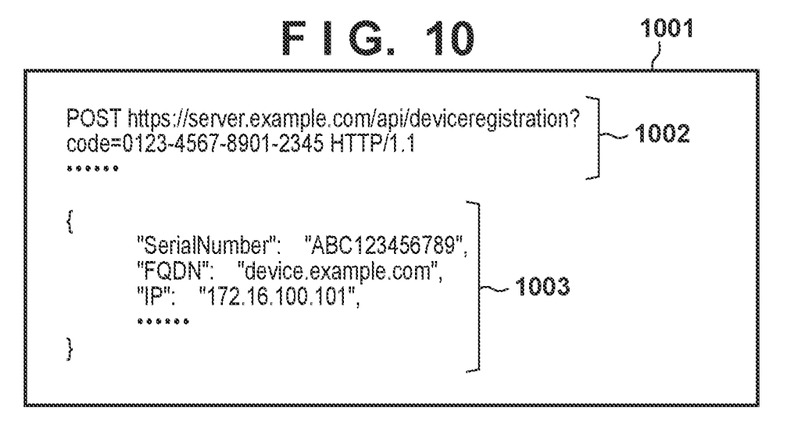
FIG. 10 is a diagram showing the data structure of a device registration request of an embodiment of the present invention.

FIG. 10 shows an example of the data structure of a device registration request 1001 that slave devices (e.g., MFPs 101-103) transmit at the time of registering themselves with the cloud server 105 via the Internet 104. The device registration request 1001 is an HTTP request, for example. A header 1002 of the device registration request 1001 represents processing for accessing a Web Service with an HTTP POST request and calling a "deviceregistration" API. The device registration code is designated in a query parameter code of the URL. The device registration code that is designated here corresponds to the device registration code input in FIG. 6.

Table 2 illustrates a description of information that is contained in a body 1003 of the device registration request 1001. In Table 2, FQDN is the abbreviation for Fully Qualified Domain Name, and is a description format that designates all information without omission such as the host name and the domain name.

TABLE 2

| Item | Description |
|---|---|
| SerialNumber | Serial number of device |
| FQDN | FQDN of device |
| IP | IP address of device |

Data Structure of Response to Device Registration Request

Figure 11:
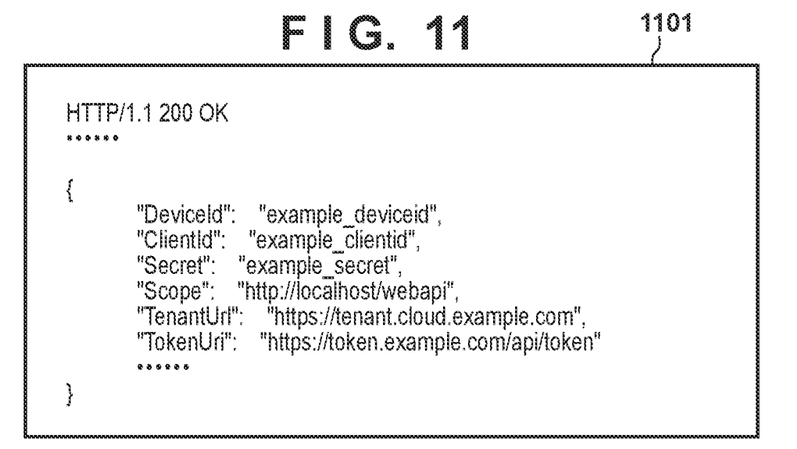
FIG. 11 is a diagram showing the data structure of a response of an embodiment of the present invention.

FIG. 11 shows an example of the data structure of a response 1101 to the device registration request 1001. In the present embodiment, an example using OAuth authentication is shown, but the authentication method is not particularly limited, and may be another authentication method. OAuth is an open standard for providing authorization, and the specification of OAuth 2.0 which is currently the mainstay protocol is prescribed in RFC 6749 and RFC 6570 of RFC (Request For Comments). Henceforth, terms relating to OAuth authentication are assumed to follow the descriptive contents of the aforementioned RFC.

Description of information contained in the body of the response 1101 is shown in Table 3.

TABLE 3

| Item | Description |
| --- | --- |
| DeviceId | Identifier of device |
| ClientId | Identifier of client; Use when requesting Oauth access token |
| Secret | Secret; Use when requesting Oauth access token |
| Scope | Scope; Use when requesting Oauth access token |
| TenantUrl | Tenant URL on cloud service |
| TokenUri | Use when requesting access token |

Data Structure of Access Token Request

Figure 12:
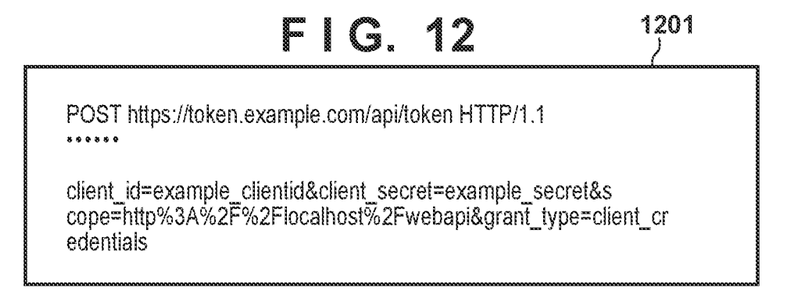
FIG. 12 is a diagram showing the data structure of an access token request of an embodiment of the present invention.

FIG. 12 shows an example of the data structure of an access token request 1201 that slave devices (e.g., MFPs 101-103) transmit at the time of performing OAuth authentication of the cloud server 105 via the Internet 104. The access token request 1201 is an HTTP request, for example. The header of the access token request 1201 represents processing for accessing a Web Service with an HTTP POST request and calling a "token" API. Description of information contained in the body of the access token request 1201 is shown in Table 4.

TABLE 4

| Item | Description |
| --- | --- |
| client_id | Identifier of client |
| client_secret | Secret |
| scope | Scope |
| grant_type | Authentication type |

Data Structure of Response to Access Token Request

Figure 13:
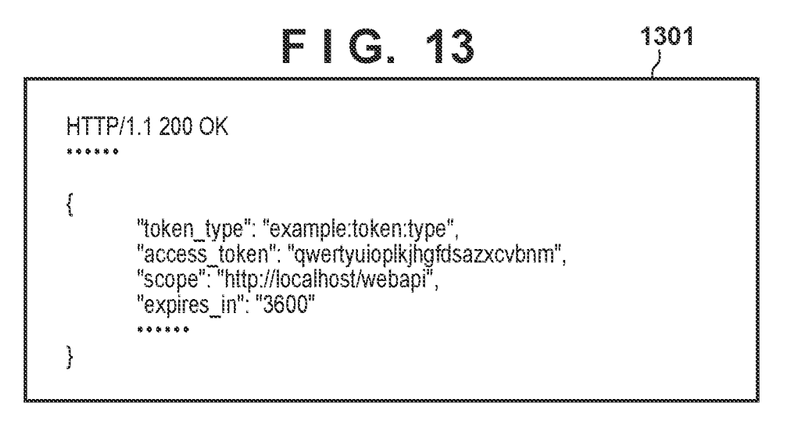
FIG. 13 is a diagram showing the data structure of a response of an embodiment of the present invention.

FIG. 13 shows an example of the data structure of a response 1301 to the access token request 1201. Description of information contained in the body of the response 1301 is shown in Table 5.

TABLE 5

| Item | Description |
| --- | --- |
| token_type | Type of access token |
| access_token | Access token |
| scope | Scope |
| expires_in | Validity period |

Processing Flow of Device Registration Application

Figure 14:
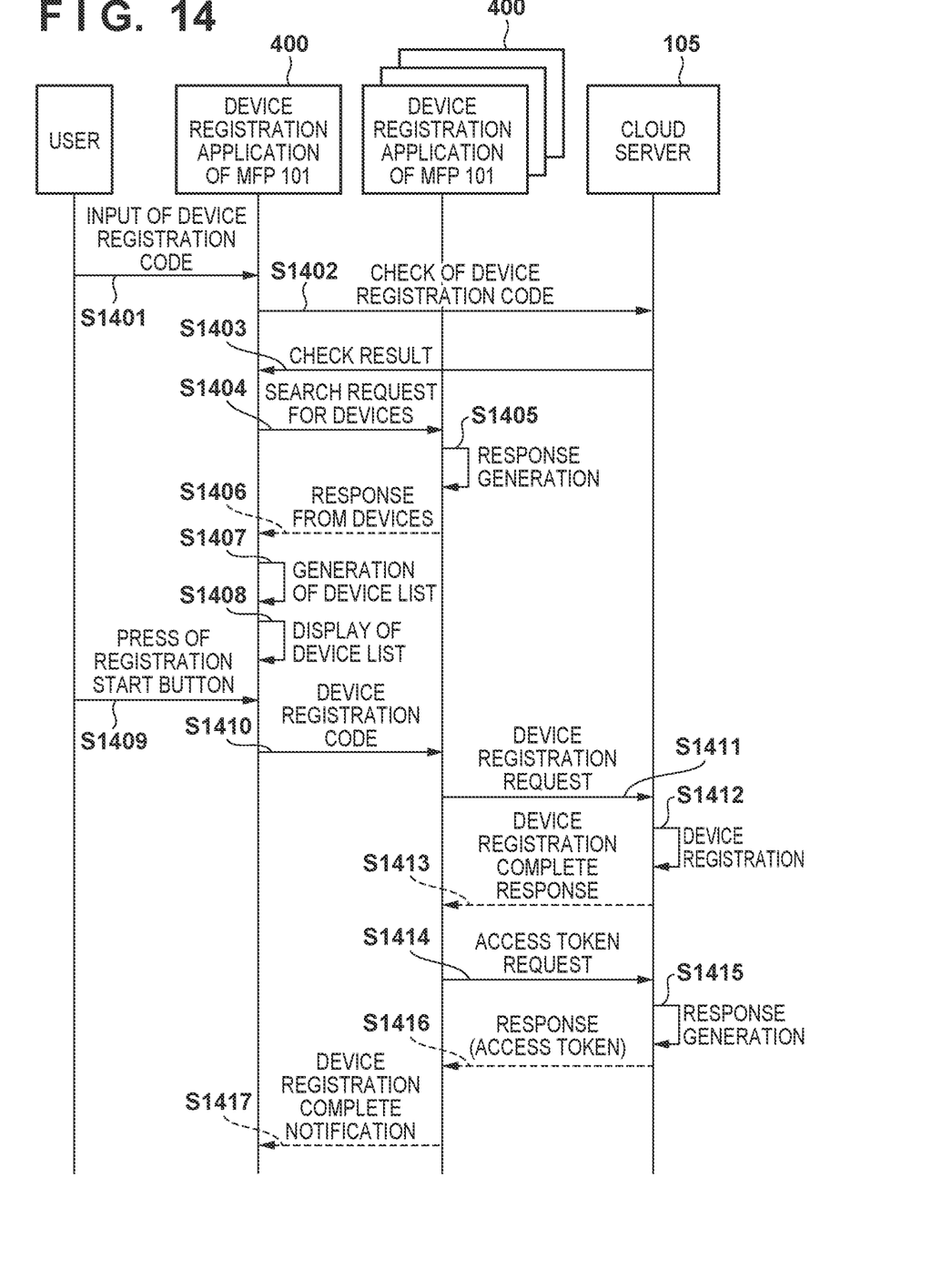
FIG. 14 is a diagram showing example operations of an embodiment of the present invention.

An example of device registration processing by the application 400 will be illustrated, with reference to FIG. 14. FIG. 14 illustrates the case where the user operates the MFP 101, that is, the case where the NET 101 operates as the master device. In the case where the user operates another device, the operations of the MFP 101 are substituted to that other device. The processing according to FIG. 14 is started by the user pressing the icon 502 of the main menu 500 displayed on the display unit 202.

The application 400 of the MFPs 101 to 103 is assumed to be started immediately after startup of the MFPs 101 to 103. and to be operating in the background. In FIG. 14, the MFP 101 operates as the master device, and also operates as a slave device. In other words, the MFP 101 transmits a device registration code to other devices, together with registering itself with the target tenant using this device registration code. In order to clearly show the flow of communication within the host, the MFP 101 operating as the master device and the MFP 101 operating as a slave device are shown separately. The application 400 of the MFP 101 is capable of executing the processing of FIG. 14, regardless of whether the MFP 101 is registered or not registered with the target tenant.

In step S1401, the MFP 101 (specifically, input management unit 403) acquires a device registration code input by the user via the operation unit 305. As described above, if the MFP 101 already holds a device registration code, the application 400 may use this held device registration code, instead of input from the user.

In step S1402, the MFP 101 (specifically, input management unit 403) queries the cloud server 105 as to whether the device registration code is valid. This query may be performed by transmitting a request in the same format as the abovementioned device registration request 1001 to the cloud server 105. Alternatively, a request in another format for checking whether the device registration code is valid may be transmitted.

The cloud server 105 determines whether the device registration code matches a device registration code issued thereby in the past. Also, in the case where a validity period is set for the device registration code, the cloud server 105 determines whether the device registration code is within the validity period. For example, the cloud server 105 extracts the device registration code from the URL of the header 1002 of the device registration request 1001, checks the date-time of issue of the extracted device registration code, and judges that the validity period has expired when a given period has elapsed since issue.

In step S1413, the cloud server 105 notifies the determination result as to whether the device registration code is valid to the MFP 101. This notification may be performed by transmitting a response in the same format as the abovementioned response 1101 to the MFP 101. Alternatively, a response in another format for notifying the determination result as to whether the device registration code is valid may be transmitted.

In the case where it is notified that the device registration code is not valid, the MFP 101 may present a message such as "The device registration code is not valid" or "The validity period has expired" including the specific cause to the user, and prompt the user to re-input a device registration code. In the case where information indicating that the validity period has expired is included in the contents of the response 1101 or where a normal response is not obtained due to an error of some kind, the MFP 101 does not save the device registration code input by the user. If within the validity period, the MFP 101 saves the device registration code in the input management unit 403. By holding a valid device registration code, input by the user can be omitted at the time of re-executing the device registration application in cases such as where device registration fails. The MFP 101 transitions to subsequent processing, if it is notified that the device registration code is valid.

In step S1404, the MFP 101 (specifically, input management unit 403) broadcasts the request 902 on the network (i.e., LAN 106) to which the MFP 101 is connected. The MFP 101 is thereby capable of detecting devices connected to the same network as the MFP 101. In the example in FIG. 1, the PC 100, the MFP 102 and the MFP 103 receive the request 902. For the purposes of description, the MFP 101 is assumed to also be capable of receiving the request 902.

In step S1405, the slave devices (specifically, input management unit 403), having received the request 902, generate the response 903 to the request 902. In the example in FIG. 1, the MFPs 101 to 103 are assumed to each generate the response 903. Since the application 400 is not installed on the PC 100, the PC 100 does not generate the response 903. In step S1406, the slave devices (specifically, input management unit 403) transmit the response 903 to the MFP 101, and the MFP 101 receives this response.

In step S1407, the MFP 101 (specifically, device list generation unit 404) specifies unregistered devices by analyzing the responses 903. As described above, if Status in the response 903 is "Not registered", it is determined that the device is an unregistered device. Furthermore, the MFP 101 (specifically, device list generation unit 404) generates a list of specified unregistered devices. In step S1408, the MFP 101 (specifically, device list generation unit 404) presents the generated list of unregistered devices to the user as the device list 702. As described above, the device list 702 includes identification information of the specified unregistered devices.

In step S1409, the MFP 101 (specifically, device registration unit 402) waits for a registration start instruction from the user. The registration start instruction is given by pressing the abovementioned registration start button 703, for example. Upon acquiring the registration start instruction from the user, the MFP 101 (specifically, device registration unit 402), in step S1410, transmits the device registration code to the specified unregistered devices. In the case where a plurality of unregistered devices are specified, the MFP 101 transmits the device registration code to each of the plurality of unregistered devices. Transmission of the device registration code may be performed by a unicast that uses the IP address included in the response 903.

In step S1410, the unregistered devices (specifically, device registration unit 402) transmit the device registration request 1001 to the cloud server 105. In step S1411, the cloud server 105 registers the devices with the target tenant. In step S1412, the cloud server 105 transmits the device registration complete response 1101 as a response to the device registration request 1001. Information required in order to acquire an access token for OAuth authentication is included in the response 1103.

In step S1414, the unregistered devices (specifically, device registration unit 402) transmit a request 1202 for an access token to the cloud server 105. The access token request 1201 is created based on information in the response 1101. In step S1415, the cloud server 105 generates the response 1301 including the access token. In step S1416, the cloud server 105 transmits the response 1301 including the access token as a response to the request 1202. The unregistered devices are capable of using the acquired access token at the time of accessing APIs of the cloud service. In addition to acquisition of the access token, the unregistered devices may install an application required in order to use the cloud server 105.

In step S1417, the devices (specifically, device registration unit 402) judged to be unregistered transmit a device registration complete notification to the MFP 101. The MFP 101, having acquired the result of registration processing from all the unregistered devices, generates the registration result screen 801, and presents the generated registration result screen to the user.

According to the above embodiment, the user, by operating the MFP 101, is able to register unregistered devices within the same network that are automatically detected collectively with the target tenant. Thus, the user no longer needs to operate and register unregistered devices individually with the target tenant, and the burden on the user is reduced. Furthermore, the time taken before the user starts using the cloud service is shortened.

In the abovementioned embodiment, all of the unregistered devices listed in the device list 702 are targeted by the application 400 for registration with the target tenant. Alternatively, only some of the unregistered devices listed in the device list 702 may be targeted by the application 400 for registration. The devices targeted for registration may be devices instructed by the user, for example. In this case, the device list screen 701 may include a check box for every device in the device list 702, and specify devices to be registered based on input to these check boxes.

In the abovementioned embodiment, the case where devices are registered with the target tenant of a cloud service was addressed. The cloud service with which devices are registered may be a multi-tenant cloud service or a single-tenant cloud service. In either case, registering devices with the tenant of a cloud service is one form of registering devices with a cloud service. In the case where the cloud service is a multi-tenant cloud service, each tenant can be regarded as a service with which to register devices. Also, devices may be registered with other services apart from cloud services.

In the abovementioned embodiment, MFPs are treated as devices to be registered with the tenant of a cloud service. The devices to be registered with the tenant of a cloud service can include devices other than MFPs, such as PCs. smartphones, IoT (Internet of Things) devices, vehicles, electrical appliances and industrial machinery, for example.

In the abovementioned embodiment, in step S1411, the device registration unit 402 of the application 400 performs processing for registering the client device with the target tenant. Alternatively, another application within the client device may perform processing for registering the client device with the target tenant.

In the abovementioned embodiment, the master device (MFP 101) transmits a device registration code to the slave devices as registration processing for registering the slave devices with the target tenant. Alternatively, if the cloud service allows, the master device may transmit a request to register the slave devices to the cloud server 105.

Second Embodiment

A second embodiment of the present invention will be described. The variations described in the first embodiment are similarly applicable to the second embodiment. In the first embodiment, unregistered. devices, that is, devices that are not registered with any tenant, are collectively registered with the target tenant. In the second embodiment, devices apart from unregistered devices, that is, devices that are already registered with a tenant, are also capable of registering with the target tenant. Since it is not necessary to include devices that are already registered with the target tenant in the devices to be registered, devices that are already registered with other tenants different from the target tenant are also included in the devices to be registered. Devices that are already registered with other tenants different from the target tenant will be called registered devices. Also, devices that are registered with the target tenant will be called registration-unrequired devices. Hereinafter, the description will focus on differences from the first embodiment.

Figure 15:
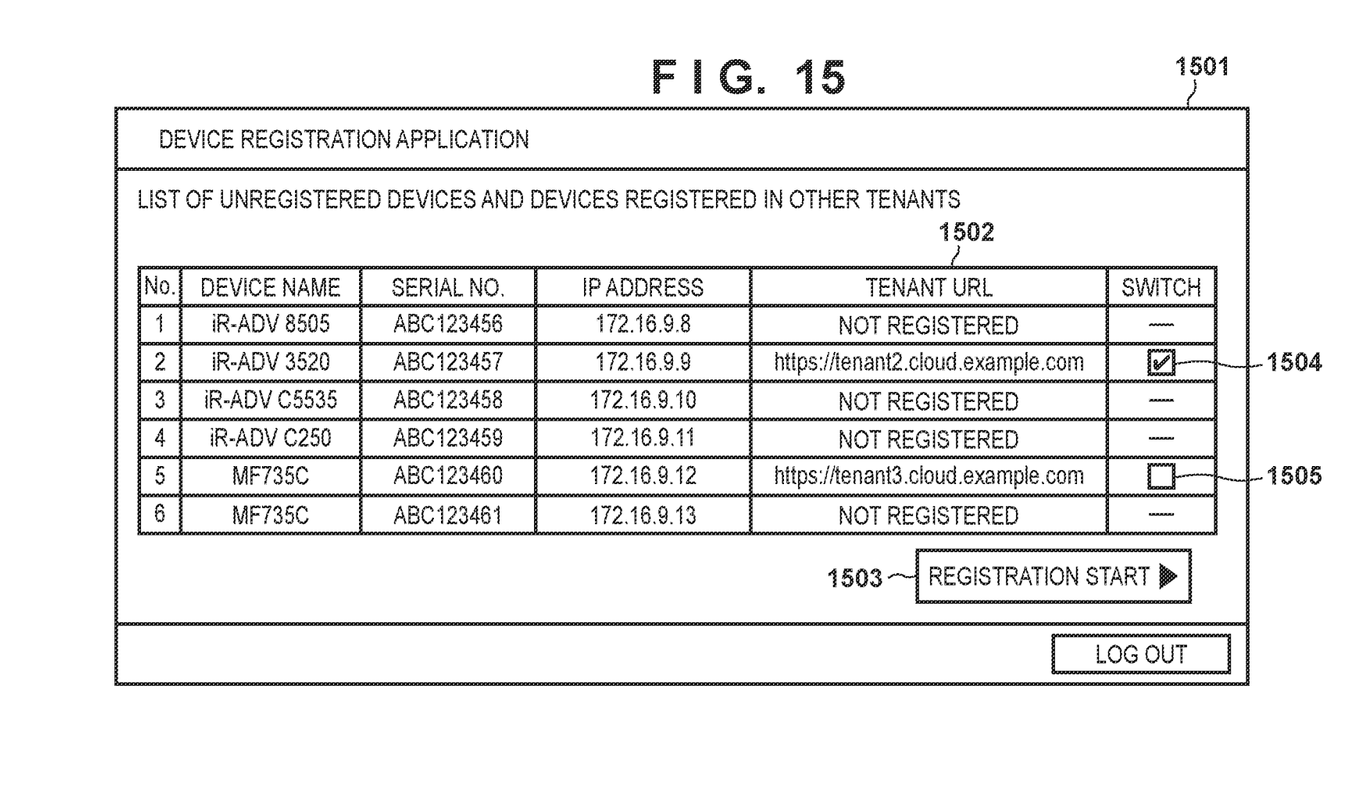
FIG. 15 is a diagram showing an example of a screen of an embodiment of the present invention.

The application 400 (specifically, device list generation unit 404) displays a device list screen 1501 of FIG. 15, instead of the device list screen 701 shown in FIG. 7. The device list screen 1501 includes a device list 1502, a button 1503, and check boxes 1504 and 1505.

The device list 1502 is a list of devices determined as not being registered with the target tenant by the device list generation unit 404, among the devices detected by the device detection unit 401. Accordingly, the device list 1502 can include unregistered devices and registered devices. The device currently being operated by the user may also be included in the list. The device list 1502 may also include information for the user to identify the devices, such as serial numbers. Device names and IP addresses may also function as identification information.

The device list 1502 is displayed such that detected devices are distinguishable as unregistered devices or registered devices. In the example in FIG. 15, "unregistered" is displayed in the tenant URL column of unregistered devices. Identification information of the tenant with which the devices are registered is displayed on the tenant URL column of registered devices. The identification information of the tenants is the URL of the tenants, for example. In this way, the MFP 101 presents to the user whether detected devices are registered with other tenants.

The device list 1502 includes a check box (e.g., check boxes 1504 and 1505) for each of the registered devices. The check boxes are GUI components for acquiring an instruction from the user as to whether to register the registered devices with the target tenant. In the case where the check box is checked such as the check box 1504, the registered device (device already registered with the tenant identified by https://tenant2.cloud.example.com) is included in the devices to be registered with the target tenant. In the case where the check box is not checked such as the check box 1505, the registered device (device already registered with the tenant identified by https://tenant3.cloud.exainple.com) is not included in the devices to be registered with the target tenant. The user is able to instruct which devices are to be registered, by switching the checking of the check boxes 1504 and 1505.

A check box is not included for unregistered devices. Unregistered devices are targeted for registration with the target tenant without depending on an instruction from the user. As with the modification described in the first embodiment, a configuration may be adopted in which it is possible to instruct whether or not to register an unregistered device.

When the button 1503 labeled "Start Registration" is pressed by the user, the device registration unit 402 performs registration processing for registering unregistered devices and instructed registered devices with the target tenant, among the devices listed in the device list 1502.

Figure 17:
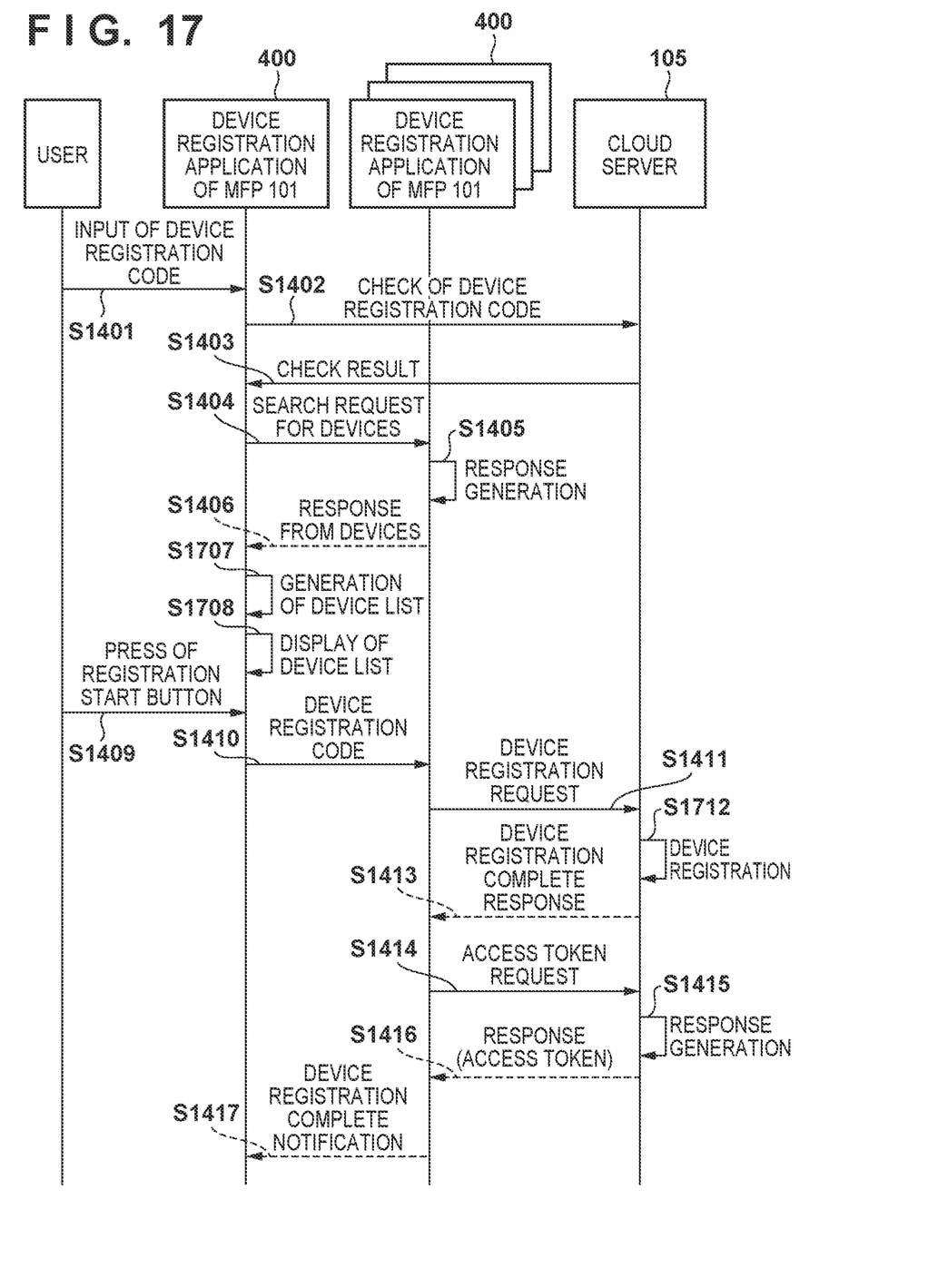
FIG. 17 is a diagram showing example operations of an embodiment of the present invention.

An example of the device registration processing by the application 400 will be illustrated, with reference to FIG. 17. Hereinafter, the description will focus on differences from the first embodiment. Steps S1401 to S1406, steps S1409 to S1411 and steps S1413 to S1417 are similar to the first embodiment.

In step S1707, the MFP 101 (specifically, device list generation unit 404) specifies unregistered devices and registered devices, among the detected devices, by analyzing the responses 903. As described above, if Status within the response 903 is "Not registered", it is determined that the device is an unregistered device. If Status within the response 903 is "Registered" and Server-Url is other than the URL of the target tenant, it is determined that the device is a registered device. Furthermore, the MFP 101 (specifically, device list generation unit 404) generates a list of specified devices.

In step S1708, the MFP 101 (specifically, device list generation unit 404) presents the generated list of devices to the user as the device list 1502. As described above, the device list 1502 includes identification information of the specified unregistered devices and registered devices. The user is able to instruct which registered devices are to be registered with the target tenant by checking the check boxes of the device list 1502.

In step S1411, the cloud server 105 registers devices with the target tenant. In the case where a device is already registered with another tenant and registration across a plurality of tenants is not recognized, the cloud server 105 cancels the existing registration of the device, and newly registers the device with the target tenant. In the case where a device is already registered with another tenant and registration across a plurality of tenants is recognized, the cloud server 105 may newly register the device with the target tenant, without canceling the existing registration of the device.

In the abovementioned embodiment, slave devices that are registered devices can also be registered with the target tenant.

In the abovementioned embodiment, the device list 1502 does not include registration-unrequired devices, that is, devices already registered with the target tenant. Alternatively, the device list 1502 may include registration-unrequired devices. The user is thereby able to grasp the registration-unrequired devices that are connected to the same network as the master device. The URL of the target tenant or "Registered" may be displayed in the tenant URL column of the registration-unrequired devices. Even if registration-unrequired devices are included in the device list 1502, processing for registration with the target tenant is not performed on these devices.

According to the abovementioned embodiment, the burden on the user for registering devices with a service decreases.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a. compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-035219, filed Mar. 2, 2020, which is hereby incorporated by reference herein in its entirety.

What is claimed is:

1. An information processing apparatus for registering information processing apparatuses, the apparatus comprising:
at least one processor and at least one memory coupled to the at least one processor,
the at least one memory having stored therein instructions that, when executed by the at least one processor, cause the at least one processor to act as:
a first acceptance unit configured to accept a first user operation for inputting a code to register the information processing apparatus in association with a tenant;
a detection unit configured to detect other information processing apparatuses connected to a same network as the information processing apparatus, in accordance with the code input by the user operation being verified and the information processing apparatus being registered in association with the tenant;
a second acceptance unit configured to accept a second user operation for selecting at least one information processing apparatus from the other information processing apparatuses detected by the detection unit; and
a registration unit configured to perform registration processing for registering the at least one information processing apparatus selected by the second user operation.

2. The information processing apparatus according to claim 1, wherein the registration processing includes transmitting information to be used in registration in association with the tenant to the at least one information processing apparatus.

3. The information processing apparatus according to claim 2, wherein the instructions further cause the at least one processor to act as:
an acquisition unit configured to acquire the information to be used in registration in association with the tenant from a user.

4. The information processing apparatus according to claim 1, wherein the instructions further cause the at least one processor to act as:
a presentation unit configured to present identification information of the information processing apparatuses detected by the detection unit.

5. The information processing apparatus according to claim 4, wherein the instructions further cause the at least one processor to act as:
a specification unit configured to specify information processing apparatuses that are not registered in association with the tenant, among the information processing apparatuses detected by the detection unit,
wherein the specification unit determines whether the information processing apparatuses detected by the detection unit are registered in association with other tenants different from the tenant, and
the presentation unit further presents to the user whether the information processing apparatuses detected by the detection unit are registered in association with other tenants.

6. The information processing apparatus according to claim 5, wherein the presentation unit further presents identification information of other tenants in association with which the information processing apparatuses detected by the detection unit are registered to the user.

7. The information processing apparatus according to claim 1, wherein the tenant is provided by a cloud service.

8. The information processing apparatus according to claim 1, wherein the information processing apparatus includes an image processing apparatus.

9. The information processing apparatus according to claim 1, wherein the information processing apparatuses detected by the detection unit include an image processing apparatus.

10. A non-transitory storage medium comprising a computer program including instructions, wherein the instructions, when executed by one or more processors of an information processing apparatus, cause the one or more processors to:
accept a first user operation for inputting a code to register the information processing apparatus in association with a tenant;
detect other information processing apparatuses connected to a same network as the information processing apparatus, in accordance with the code input by the user operation being verified and the information processing apparatus being registered in association with the tenant;
accept a second user operation for selecting at least one information processing apparatus from the detected information processing apparatuses; and
perform registration processing for registering the at least one information processing apparatus selected by the second user operation.

11. An information processing method to be executed by an information processing apparatus in order to register information processing apparatuses, the method comprising:
accepting a first user operation for inputting a code to register the information processing apparatus in association with a tenant;
detecting other information processing apparatuses connected to a same network as the information processing apparatus, in accordance with the code input by the user operation being verified and the information processing apparatus being registered in association with the tenant;
accepting a second user operation for selecting at least one information processing apparatus from the detected information processing apparatuses; and performing registration processing for registering the at least one information processing apparatus selected by the second user operation.

\* \* \* \* \*